United States Patent [19]

Appenzeller

[11] 4,187,594

[45] Feb. 12, 1980

[54] ROLL FOR PRESSURE TREATING WEBS OF MATERIAL

[75] Inventor: Valentin Appenzeller, Kempen, Fed. Rep. of Germany

[73] Assignee: Eduard Küsters, Krefeld, Fed. Rep. of Germany

[21] Appl. No.: 886,431

[22] Filed: Mar. 14, 1978

[30] Foreign Application Priority Data

Oct. 4, 1977 [DE] Fed. Rep. of Germany ....... 2744524
Dec. 7, 1977 [DE] Fed. Rep. of Germany ....... 2754380

[51] Int. Cl.² ............................................. B21B 13/02
[52] U.S. Cl. ................................................ 29/116 AD
[58] Field of Search .................. 29/113 AD, 116 AD; 102/170, 162 B, 185 R

[56] References Cited

U.S. PATENT DOCUMENTS 2,908,964 10/1959 Appenzeller ............... 29/113 AD X
3,146,160 8/1964 Kankaanpaa ............... 29/113 AD X

FOREIGN PATENT DOCUMENTS 1438943 4/1966 France ........................... 29/116 AD Primary Examiner—Dorsey Newton
Attorney, Agent, or Firm—Kenyon & Kenyon

[57] ABSTRACT

In a roll for pressure treating webs of material comprising a stationary core which is surrounded by a rotatable hollow cylinder spaced from the core, and in which there are provided, between the core and the hollow cylinder, longitudinal seals and end seals which seal off a longitudinal chamber which extends between the core and the hollow cylinder on the side of the working gap and is filled with a pressure liquid, with discharge canals provided in the core for discharging leakage liquid from the space between the core and the hollow cylinder which remains between the core and the hollow cylinder on the side facing away from the working gap, an improved sealing arrangement, which includes a strip which extends along the hollow cylinder over the length of the longitudinal chamber following in the direction of rotation, the seal projecting at an angle from the core toward the longitudinal seal up to the inner circumference of the hollow cylinder and discharge canals opening in the region between the point where the strip is secured to the core and the longitudinal seal, is provided to reduce friction.

12 Claims, 5 Drawing Figures

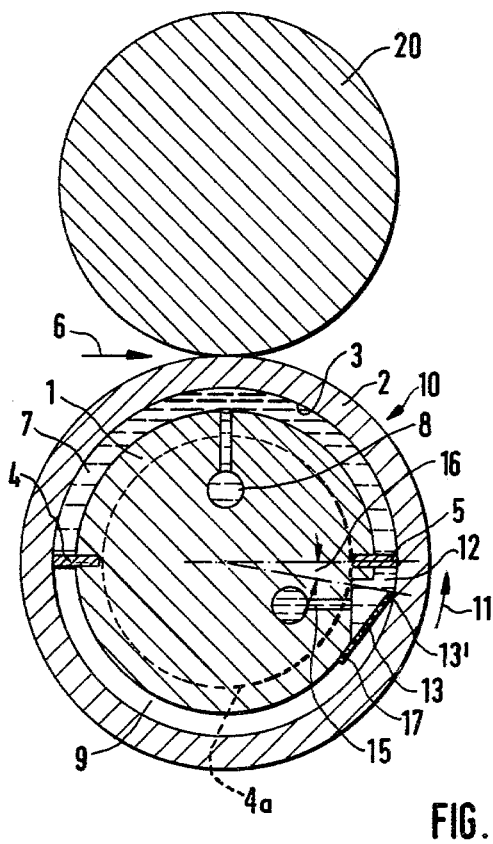
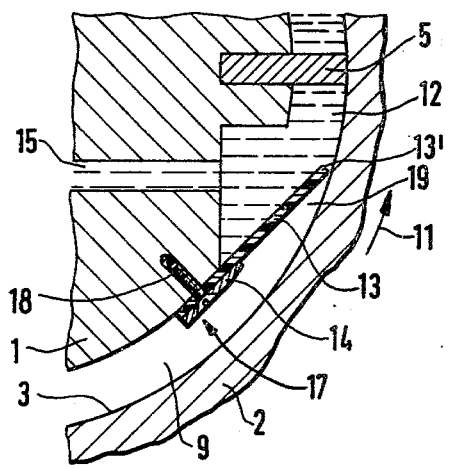
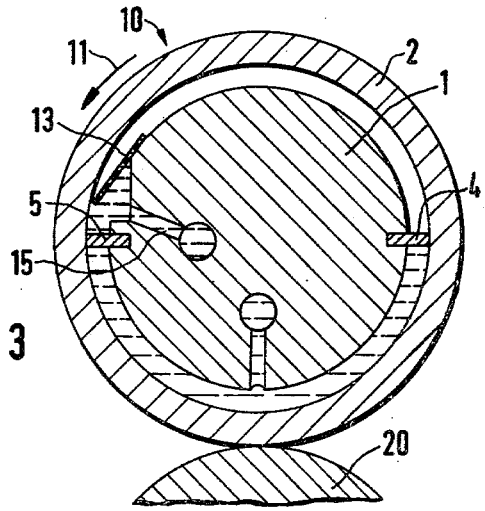
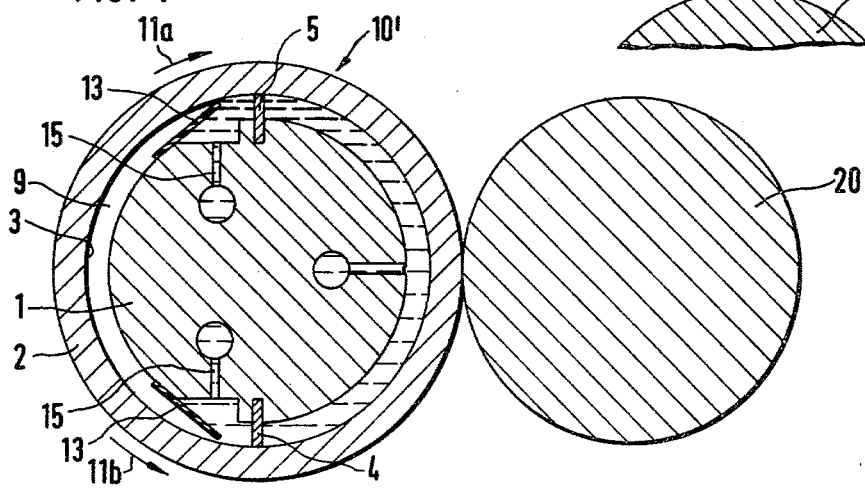

ROLL FOR PRESSURE TREATING WEBS OF MATERIAL

BACKGROUND OF THE INVENTION

This invention relates to hydraulic controlled deflection rolls [such as are sold under the trademark "Swimming Roll" of Eduard Kuesters] in general and more particularly to an improved arrangement for such rolls which minimizes friction.

The rolls consist of a stationary core and a hollow roll or cylinder surrounding the stationary core with a spacing and rotatable thereabout. End seals are provided at the ends of the working width of the roll between the core and the hollow cylinder. Longitudinal seals are also provided along the core on both sides thereof. These seal the space between the core and the inside of the hollow cylinder so as to form a longitudinal chamber situated on the working side of the roll which is filled with the pressure liquid. Means are provided in the core for discharging leakage liquid from the space between the core and the hollow cylinder which remains between the core and the hollow cylinder on the side facing away from the working gap, i.e., from the area outside the longitudinal chamber.

Rolls of this type are known in principle from German Pat. Nos. 1,026,609 and 1,193,739, (See also U.S. Pat. No. 2,908,964), in which the longitudinal chamber extends over approximately one-half the circumference of the core, i.e., in which the sealing strips are arranged opposite each other at about half the height of the core. While in these designs the end seal is provided by a sealing plate arranged transversely to the axis, a roll is known from the Japanese Provisional Design Patent No. 5835/65, in which two parallel slots directed toward the roll gap are provided along the core. These slots are connected by circular slots at their ends. An endless sealing strip of corresponding shape is inserted into the entire slot, resting against the inner circumference of the hollow cylinder and enclosing the longitudinal chamber.

Since the working pressure is exerted in these rolls by the pressure liquid contained in the longitudinal chamber, it is uniform over the width of the web. Rolls of this type therefore are always used when accurate maintenance of uniform pressure over the width of the web is essential. This is the case particularly in the paper industry, where, with web widths of up to 10 m, uniform pressure cannot be exerted at all by other means.

For some time now, very high operating speeds in the range about 1500 m/min have been used in some applications. This can be the case in the area of paper manufacturing as well as paper converting and processing.

It has now been found that, with the required large increase of the running velocities, the power required for driving the rolls mentioned at the outset increases substantially. At higher speeds, the friction losses at the sealing strip become secondary to the friction of the hollow cylinder at the pressure liquid located between the core and the hollow cylinder. The viscous pressure liquid is contained in a relatively narrow space between the very rapidly revolving hollow cylinder and the stationary core and is carried along or held fast, respectively, at the boundary surfaces, so that a higher shear stress is developed. The larger the area of the circumference containing the pressure liquid, the higher become the losses due to liquid friction. The resistance component of the pressure liquid contained under pressure in the longitudinal chamber cannot be changed. However, a considerable resistance component is also supplied by the leakage liquid which escapes past the longitudinal seals into the space between the hollow cylinder and the core on the side facing away from the working gap. This liquid accumulates in the interspace, builds up in front of the longitudinal seal following in the direction of rotation of the hollow cylinder and, after some time, partially fills the interspace. An undesirable pressure buildup may, finally, even occur in the interspace.

In the arrangement described in German Offenlegungsschrift 24 61 914 it has been attempted to provide a remedy for this problem by making the longitudinal chamber in the circumferential direction particularly narrow. This, of course, also reduces the area available for exerting pressure. However, in the special embodiment dealt with in the German Offenlegungsschrift 24 61 914, the interest was only in rolls which must, at high speed, transmit only a small line pressure.

SUMMARY OF THE INVENTION

It is an object of the present invention to reduce the liquid friction occurring at high speeds in rolls of the type mentioned above, without otherwise interfering with the design of the roll.

To solve this problem, according to the present invention, a strip which extends along the hollow cylinder is disposed in the interspace. The strip is secured at the core and cooperates with the inner circumference of the hollow cylinder and directs pressure liquid which gets between the hollow cylinder and the core into discharge canals which are formed in the core.

Thereby, the liquid that has passed into the interspace is continuously removed, so that the interspace cannot fill up and the part of the liquid friction which would otherwise be produced thereby, is avoided.

In a first embodiment, the strip is cantilevered in the direction of rotation from the core toward the inner circumference of the hollow cylinder and is arranged in the vicinity of that longitudinal seal toward which the hollow cylinder runs in the interspace.

The strip creates a chamber between the core and the hollow cylinder, in front of the longitudinal seal which follows the strip in the circumferential direction, i.e., against which the hollow cylinder runs. The leakage liquid, which is continuously taken along by the revolving hollow cylinder and has penetrated, through leakage losses at the longitudinal seals, into the space between the core and the hollow cylinder removed from the working gap, is continuously transported into this chamber. The discharge canals are arranged so that they open into this chamber and can discharge the leakage liquid continuously. The strip has the effect of holding the leakage liquid in the chamber, which is narrow because of the proximity of the strip to the adjacent longitudinal seal. For, because of the inclined position of the strip, the leakage liquid contained in the chamber can no longer flow back from the chamber into the interspace, since the strip then leans firmly against the inner circumference of the hollow cylinder, forming a seal. The oblique position of the strip results in an acute angle between its outside and the inner circumference of the hollow cylinder, into which the leakage liquid found at the inner circumference of the hollow cylinder is drawn. It has been found that, especially at the higher speeds discussed here, the leakage liquid adhering to the inner circumference is taken along without trouble under the edge of the strip and that even a certain pumping effect is obtained, inasmuch as an overpressure, which pushes the leakage liquid collecting therein away through the discharge canals, or in any event aids the discharge, can occur in the narrow chamber formed by the strip.

The strip may rest lightly against the inner circumference of the hollow cylinder with its free long edge.

The pull-through effect, by means of which the leakage liquid adhering to the inner circumference of the hollow cylinder is transported into the chamber, is preserved in this case. While the power required because of the contact of the strip with the inner circumference of the hollow cylinder is increased slightly, this amount is negligible in view of the amount saved by decreasing the width of the accumulation zone to the distance between the longitudinal seal and the strip and the accordingly reduced liquid fraction.

However, the present invention also works if the free long edge of the strip is spaced a small distance from the inner circumference of the hollow cylinder. Normally, the distance should be as small as possible. Thus, the strip should just not touch the inner circumference of the hollow cylinder. If there is a particularly large accumulation of leakage liquid in the space between the core and the hollow cylinder, a somewhat larger but still very small distance may be advisable, so that no head forms on the outside of the strip.

However, the strip can also be designed as a wiper which rests against the inner circumference of the hollow cylinder against the direction of rotation of the latter and wipes the hollow cylinder off continuously, so that no further pressure liquid is transported into the back-up zone.

It is advantageous if the wiper rests against the hollow cylinder in the vicinity of that longitudinal seal toward which the hollow cylinder runs, so that the circumferential area still remaining between the wiper and the respective longitudinal seal for the development of a back-up zone is as small as possible.

The strip is preferably arranged approximately tangential to the core in all embodiments.

The core normally has a cross section which is matched to the inner circumference of the hollow cylinder, i.e., it is approximately circular overall. However, certain design requirements may dictate deviations of the external shape from the cylindrical shape. The inclined position of the strip is arranged, regardless of these deviations, in such a manner that, if the outline of the core cross section were completed to form a circle, an approximately tengential position is provided.

The width of the chamber formed by the strip should be as small as possible, so that the effect of the strip is as pronounced as possible. The free long edge of the strip can be arranged 2° to 12° ahead of the longitudinal seal following in the direction of rotation.

The strip can consist of a filler reinforced plastic material, particularly of fiberglass reinforced epoxy resin.

However, other materials which exhibit comparable stiffness and elasticity can also be considered.

BRIEF DESCRIPTION OF THE DRAWINGS

FIG. 1 is a cross section through a first embodiment of the present invention.

FIG. 2 is an enlarged section from FIG. 1.

FIGS. 3 and 4 are views similar to FIG. 1 and show further embodiments of the present invention.

DETAILED DESCRIPTION OF THE INVENTION

Figure 5:
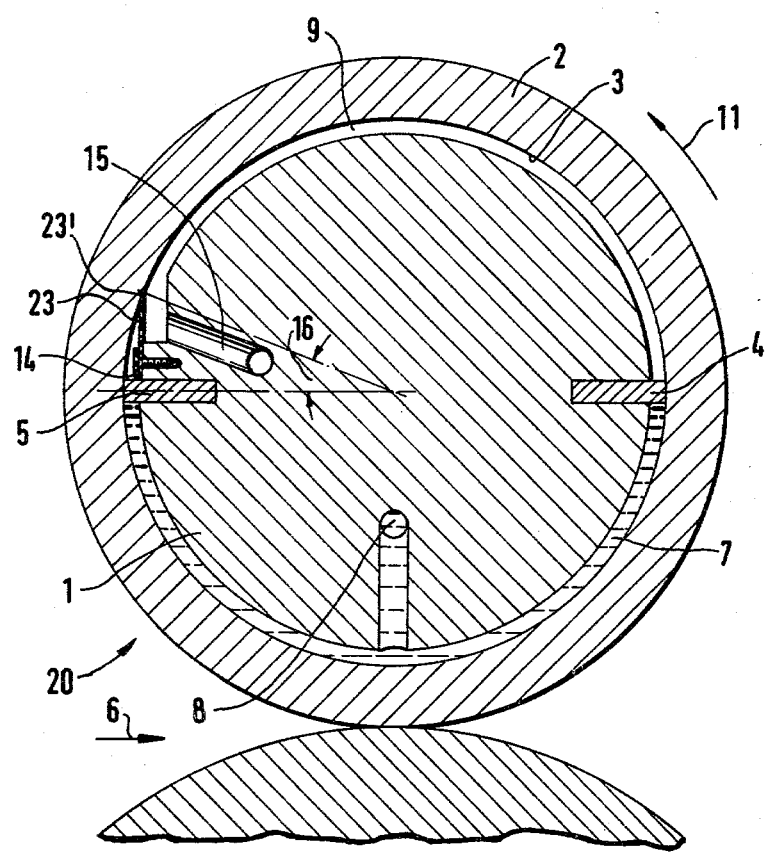
FIG. 5 is an embodiment in which the strip is designed as a wiper.

The roll 10 in which friction losses are to be reduced comprises a stationary core 1, which itself has the shape of a solid cylinder which extends over the width of a web and is supported at the ends. The core 1 is surrounded by a hollow cylinder 2, the inner circumference 3 of which leaves a radial space from the core 1. This distance allows the core 1 to bend under load inside the hollow cylinder 2 without touching the latter.

Between the core 1 and the hollow cylinder 2, longitudinal seals 4 and 5 are provided. These are secured in the core 1 and rest against the inner circumference 3 of the hollow cylinder 2. The longitudinal seals 4 and 5 are merely indicated by shaded rectangles, as their detail design is not important to the present invention. End seals, of which one is shown at 42a, are provided at the ends of the hollow cylinder as indicated by U.S. Pat. No. 2,908,964, so that on the side facing a roll gap 6, between roll 10 and counter roll 20, a longitudinal chamber 7 is sealed off between the core 1 and the hollow cylinder 2. This chamber 7 is filled with pressure liquid through the supply canals 8 provided in the core 1. The pressure of the pressure liquid presses the hollow cylinder 2 uniformly against the counter roll 20 at the roll gap 6.

The longitudinal seals 4 and 5 cannot be absolutely tight. A certain amount of leakage liquid always passes under the longitudinal seals 4 and 5 into the space 9 which is formed between the core 1 and the hollow cylinder 2 on the side away from the roll gap 6. If the hollow cylinder 2 rotates in the direction indicated by the arrow 11, this leakage liquid is taken along toward the longitudinal seal 5, toward which the hollow cylinder 2 runs. An accumulation zone forms in front of the longitudinal seal 5, into which the leakage liquid taken along by the hollow cylinder 2 is transported, and the liquid fills the space between the core 1 and the hollow cylinder 2. The accumulation zone expands gradually, since some pressure liquid is always replenished into the space 9 because of the leakage losses. In the region, in which the pressure liquid makes contact with the core 1 as well as with the hollow cylinder 2, an undesired liquid friction is obtained, which is noted by an additional power requirement particularly at high speeds of rotation.

In the space 9, according to the present invention, there is now attached to the core 1, ahead of the longitudinal seal 5, as seen in the direction of rotation 11, a strip 13, which extends from the core 1, approximately tangentially to the same, toward the inner circumference 3 of the hollow cylinder 2. The strip 13 in the illustrated embodiment consists of fiberglass reinforced epoxy resin and is attached to the core 1 at an attachment point 17 by means of a mounting strip 14 and screws 18, as can be seen in detail in FIG. 2. The mounting strip 14 extends along the one long edge of the strip 13. The free long edge 13' touches the inner circumference 3 of the hollow cylinder 2 lightly. However, it can also be a small distance from the inner circumference 3 in the unloaded condition.

The leakage liquid taken along by the hollow cylinder 2 in its rotation in the direction of the arrow 11 is driven into the acute angle 19 between the strip 13 and the inner circumference 3 of the hollow cylinder 2 and is introduced under the long edge 13' of the strip 13 into the chamber 12 which is formed between the core 1 and the hollow cylinder 2 as well as the strip 13 and the longitudinal seal 5. From the chamber 12, the liquid reaches a discharge canal 15, from which it is continuously drawn off.

The leakage liquid cannot flow back under the long edge 13' into the space 9, since then the strip 13 leans against the inside wall 3 of the hollow cylinder 2 in the manner of a sealing lip.

In this way, the zone of liquid friction is limited to the area between the longitudinal seal 5 and the long edge 13'. This zone is made as narrow as is possible for design reasons. The angle 16 (FIG. 1), by which the long edge 13' of the strip 13 is displaced from the longitudinal seal 5, is about 10° in the illustrated embodiment.

In the embodiment of FIGS. 1 and 2, in which the roll according to the present invention is the lower roll, the hollow cylinder 2 runs toward the longitudinal seal 5 from below on the side of the strip 13. In this arrangement, the strip 13 is particularly effective since, without the same, the leakage liquid transported up by the hollow cylinder would run down along the core 1 between the individual discharge canals 15, since these are designed as individual holes distributed with spacings over the length of the roll, and would get back into the lower regions of the space 9. In spite of the presence of the discharge canals 15, the space 9 could therefore not be freed completely of leakage liquid that has penetrated. Due to the strip 13, however, all the leakage liquid that has been transported up by the hollow cylinder 2 toward the longitudinal seal 5 is captured and discharged.

In the embodiment according to FIG. 3, the roll 10 is the upper roll. With a direction of rotation 11, the leakage liquid would collect in the space above the longitudinal seal 5 even without the strip 13 and could be drawn off through the discharge canals 15. Here, too, the strip 13 still makes sense, since it reliably prevents the leakage liquid from rising back up in the regions situated between the discharge canals 15.

In FIG. 4, an advantageous embodiment of a roll 10' is shown, in which a horizontal arrangement of the rolls 10', 20 is realized and the roll 10' is equipped for both directions of rotation 11a and 11b, by arranging strips 13 of the kind described above ahead of both longitudinal seals 4 and 5. If the strips 13 are made so as to make contact lightly, an increase of the effect even takes place. For, if the hollow cylinder 2 in the roll 10' revolves in the direction of rotation 11b, the leakage liquid passing through at the longitudinal seal 5 is wiped off by the strip 13 and discharged into the upper discharge canals 15. The lower srip 13 picks up the leakage liquid which remains at the inner circumference 3 of the hollow cylinder 2 in spite of the wiping at the strip 13. A similar situation applies to the other direction of rotation 11a.

The rolls 30 of FIG. 5 differs from the previous embodiments by the orientation of the strip. So as not to permit the liquid to fill larger areas of the circumference of the space 9 between the core 1 and the hollow cylinder 2, the strip 23 is designed as a wiper which extends over the length of the roll and consists, for example, of a strip of fiberglass reinforced plastic. Strip 23 is secured at one long edge to the core 1 by means of a mounting strip 14. The strip 23 extends in a direction which is against the direction of rotation 11 of the hollow cylinder 2 and forms an acute angle with the part of the inner circumference of the hollow cylinder 2 which is situated under it. As its free long edge 23', the strip 23 rests against the inner circumference 3 of the hollow cylinder 2 and wipes, from the hollow cylinder 2, the liquid taken along by the latter, so that it can get into a discharge canal 15 in the core, which opens opposite the freely projecting part of the strip 23 and from which the liquid is drawn off continuously.

The angle 16, by which the point of contact of the free long edge 23' of the strip 23 at the inner circumference 3 of the hollow cylinder 2 is ahead of the longitudinal seal 5, in a direction opposite its direction of rotation 11, is about 15° in the illustrated embodiment. However, the strip 23 can also be placed closer to the longitudinal seal 5, in order to reduce the extend of the remaining back-up zone as far as possible.

I claim:

1. In a roll for pressure treating webs of material comprising a stationary core which is surrounded by a rotatable hollow cylinder radially spaced from the core, said roll having between the core and the hollow cylinder, longitudinal seals and end seals which seal off a longitudinal chamber which extends between the core and the hollow cylinder on one side of the roll and is adapted to be filled with a pressure liquid, and discharge means provided in the core for discharging leakage liquid from the remaining space between the core and the hollow cylinder, which space remains between the core and the hollow cylinder on the other side of the roll, the improvement comprising:

a strip, which extends longitudinally along the hollow cylinder for the length of said longitudinal chamber and is secured to the core, said strip having a free long edge cooperating with the inner circumferential surface of the hollow cylinder to collect therefrom said leakage liquid in said remaining space and carried by said surface during rotation of said hollow cylinder, said strip extending from the core toward the inner circumference of the hollow cylinder and being arranged in the vicinity of that one of said longitudinal seals toward which when rotating the hollow cylinder runs, said discharge means being positioned to discharge leakage liquid collected by said strip.

2. The improvement according to claim 1, wherein the strip has a free long edge of the strip rests lightly against the inner circumference of the hollow cylinder.

3. The improvement according to claim 1, wherein the strip has a free long edge of the strip is spaced at a small spacing from the inner circumference of the hollow cylinder.

4. The improvement according to claim 1, wherein said strip is disposed approximately tangential to said core.

5. The improvement according to claim 1, wherein said strip is in the form of a wiper and rests against the inner circumference of the hollow cylinder projecting in a direction against the direction of rotation of said hollow cylinder.

6. The improvement according to claim 5, wherein said strip rests against the hollow cylinder in the vicinity of that longitudinal seal toward which the hollow cylinder when rotating runs in the space which remains.

7. The improvement according to claim 6, wherein the free long edge of the strip is disposed no more than 15° ahead of the longitudinal seal following in the direction of rotation.

8. The improvement according to claim 7, wherein the strip consists of a filler reinforced plastic material, particularly fiberglass reinforced epoxy resin.

9. The improvement according to claim 1, wherein the strip consists of a filler reinforced plastic material, particularly fiberglass reinforced epoxy resin.

10. The improvement according to claim 1, wherein the free long edge of the strip is disposed no more than 15° ahead of the longitudinal seal following in the direction of rotation.

11. The improvement according to claim 10, wherein said strip is disposed approximately tangential to said core.

12. The improvement according to claim 1, wherein said strip is made of a filler reinforced plastic material, particularly fiberglass reinforced epoxy resin.

* * * * *

UNITED STATES PATENT AND TRADEMARK OFFICE
CERTIFICATE OF CORRECTION

PATENT NO. : 4,187,594
DATED : February 12, 1980
INVENTOR(S) : Valentin Appenzeller It is certified that error appears in the above—identified patent and that said Letters Patent is hereby corrected as shown below:

Column 4, line 22, cancel "42a" and replace with --4a--.

Column 5, line 55, cancel "srip" and replace with --strip--.

Column 6, line 4, cancel "As" and replace with --At--.

Column 6, line 49, cancel "strip has a".

Column 6, line 52, cancel "strip has a".

Signed and Sealed this

First Day of July 1980

[SEAL]

Attest:

SIDNEY A. DIAMOND

Attesting Officer

Commissioner of Patents and Trademarks